US012776614B2

(12) United States Patent
Akasaka

(10) Patent No.: US 12,776,614 B2
(45) Date of Patent: Oct. 27, 2026

(54) ERBIUM DOPED FIBER OPTICAL AMPLIFIER WITH ADAPTIVE FILTER

(71) Applicant: 1FINITY Inc., Kawasaki (JP)

(72) Inventor: Youichi Akasaka, Plano, TX (US)

(73) Assignee: 1FINITY Inc., Kawasaki (JP)

(*) Notice: Subject to any disclaimer, the term of this patent is extended or adjusted under 35 U.S.C. 154(b) by 272 days.

(21) Appl. No.: 18/627,257

(22) Filed: Apr. 4, 2024

(65) Prior Publication Data

US 2025/0316946 A1 Oct. 9, 2025

(51) Int. Cl.
*H01S 3/00* (2006.01)
*H01S 3/067* (2006.01)

(52) U.S. Cl.
CPC ...... *H01S 3/06766* (2013.01); *H01S 3/06775* (2013.01)

(58) Field of Classification Search
CPC ............. H01S 3/06766; H01S 3/06775; H01S 3/1608; H01S 3/06754; H01S 3/0078; H01S 2301/04
See application file for complete search history.

(56) References Cited

U.S. PATENT DOCUMENTS

2022/0069538 A1* 3/2022 Lowder ................ G02B 6/0208
2022/0131342 A1* 4/2022 Van Rees ................ H01S 3/106
2022/0146765 A1* 5/2022 Shima ................... H01S 3/0675

* cited by examiner

*Primary Examiner* — Dennis P Joseph
(74) *Attorney, Agent, or Firm* — Maschoff Brennan

(57) ABSTRACT

According to an aspect of an embodiment, an optical signal and an optical pump signal may be obtained and multiplexed onto an erbium-doped optical fiber. The optical fiber may be configured to perform amplification of optical waveforms within a first wavelength range. Signal within the first wavelength range of the optical signal may be amplified using the optical fiber. In some embodiments, a bending radius of a bend in a fiber-based filter may be adjusted such that the filter is configured to attenuate signals in a second wavelength range in which the filter is configured to attenuate optical waveforms with respect to varying wavelength ranges depending on the bending radius of the bend in the filter. The second wavelength range may include wavelengths longer than the first wavelength range. The signals in the second wavelength range may be attenuated using the filter bent at the bending radius.

20 Claims, 7 Drawing Sheets

ERBIUM DOPED FIBER OPTICAL AMPLIFIER WITH ADAPTIVE FILTER

FIELD

The embodiments discussed in the present disclosure are related to erbium doped fiber optical amplifiers (EDFAs).

BACKGROUND

Telecommunications systems, cable television systems and data communication networks use optical networks to convey information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network. Further, optical amplification may be used to amplify optical signals that propagate through optical networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an optical signal and an optical pump signal may be obtained and multiplexed onto an erbium-doped optical fiber. The optical fiber may be configured to perform amplification of optical waveforms within a first wavelength range. Signal within the first wavelength range of the optical signal may be amplified using the optical fiber. In some embodiments, a bending radius of a bend in a fiber-based filter may be adjusted such that the filter is configured to attenuate signals in a second wavelength range in which the filter is configured to attenuate optical waveforms with respect to varying wavelength ranges depending on the bending radius of the bend in the filter. The second wavelength range may include wavelengths longer than the first wavelength range. The signals in the second wavelength range may be attenuated using the filter bent at the bending radius.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical networks may include nodes that may be configured to communicate information to each other via optical signals carried by optical fibers. In some circumstances, amplification of the optical signals within the optical fibers may enable the optical signals to travel a greater distance by compensating for losses that may affect the optical signal, such as degradations of the optical signal due to a noisy channel within the optical networks.

Amplification of optical signals within an optical network may be obtained using erbium doped fiber amplifiers (EDFAs) in some instances. However, the gain profile of EDF amplification may be dependent on certain wavelength bands. As such, EDFAs may amplify signals in certain wavelength bands more efficiently than signals in other wavelength bands. For example, EDFAs may be more commonly used to amplify signals in a conventional band (C-band) which approximately ranges from 1530 nanometers (nm) to 1565 nm and a long-wavelength band (L-band) which approximately ranges from 1565 nm to 1600 nm. Such characteristics of the EDFAs led to increased usage of the C-band and L-band in optical communications. As the optical communications using the C-band and the L-band became more common, need for utilizing other optical communication bands such as a short-wavelength band (S-band) which approximately ranges from 1495 nm to 1530 nm, increased.

However, amplifying signals in the S-band may be limited to how effectively the noise present in the C-band and the L-band may be attenuated while optimizing the gain applied to the S-band. For example, a low pass filter may be used to attenuate noise signals in the C-band and the L-band while allowing the optical signals in the S-band to pass. However, such a filter constitutes a fixed characteristic such that once the cutoff wavelength is fixed at initially assigned value, the cutoff wavelength may not be modified.

According to one or more embodiments of the present disclosure, an EDFA may be configured in a manner to allow adaptive modification of attenuation wavelength ranges in which the signals and noises are attenuated. In particular, as described in detail in the present disclosure, the EDFA may be configured such that EDFA includes a fiber-based filter in which the loss profile of the filter may be adjusted based on various applications. In particular, the filter may be bent such that it has a bend having a bending radius, and the bending radius may be tuned to modify the attenuation wavelength ranges. Such modification may allow reducing the noise amplification in wavelengths not corresponding to the optical signals being transmitted.

Embodiments of the present disclosure will be explained with reference to the accompanying drawings.

Figure 1A:
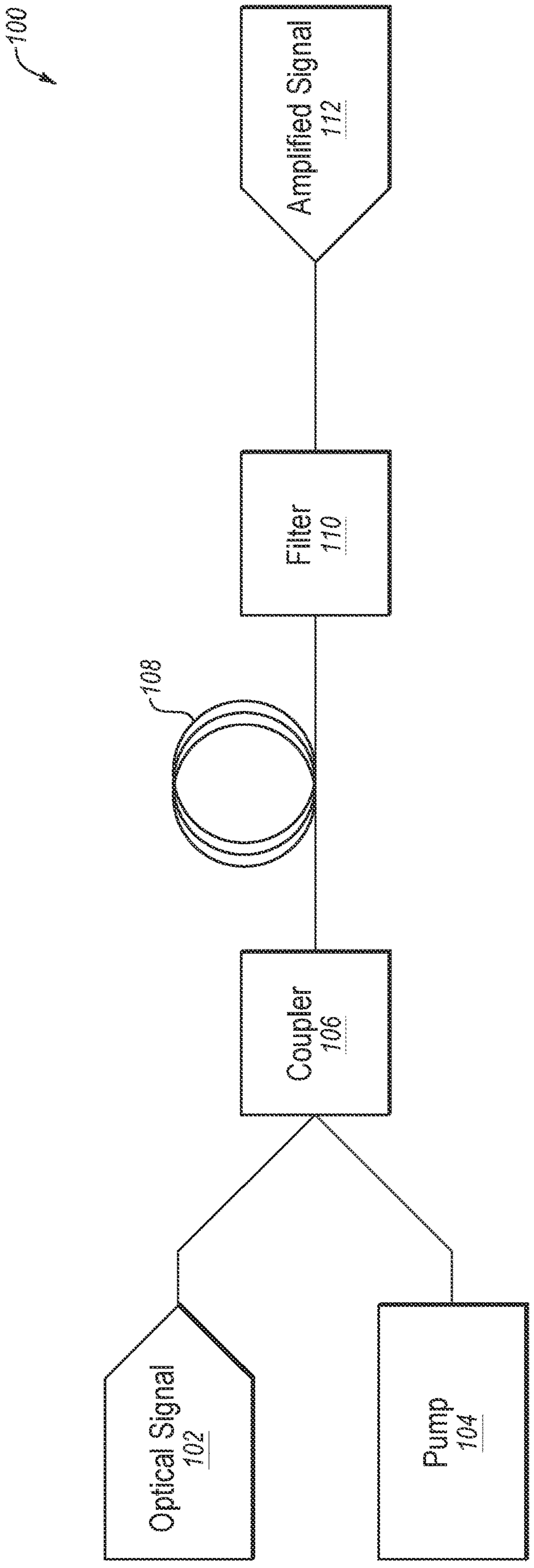
FIG. 1A illustrates an example embodiment of an erbium doped fiber optical amplifier (EDFA), in accordance with one or more embodiments of the present disclosure.

FIG. 1A illustrates an example embodiment of a EDFA 100, in accordance with at least one embodiment of the present disclosure. In general, the EDFA 100 may be configured to amplify an optical signal 102 to generate an amplified optical signal 112. The EDFA 100 may be included in any suitable optical device or network.

The optical signal 102 may include any optical signal configured to carry data. For example, the optical signal 102 may include an optical signal generated by a light emitting diode (LED), a laser such as a laser diode, having data modulated thereon and/or other similar optical signals. In some embodiments, the optical signal 102 may be generated by a transmitting source, such as an optical transmitter, configured to convey data and/or information over an optical network.

In some embodiments, the optical signal 102 may carry data within wavelength ranges corresponding to optical signal communication bands. For example, the optical signal 102 may carry data within a first wavelength range corresponding to what may be commonly referred to as the S-band of optical signal communications, which may be approximately 1495 nm to 1530 nm. In these and other embodiments, the EDFA 100 and in particular, an erbium-doped optical fiber ("optical fiber") 108 may be configured to amplify the signals in the first wavelength range.

In some embodiments, the optical pump 104 may be optically coupled to an optical coupler 106. In these and other embodiments, the optical pump 104 may be configured to generate an optical pump signal and to provide the optical pump signal to the optical coupler 106. In some embodiments, any type of optical pump may be used. For example, the optical pump 104 may be a laser diode, an arc lamp, a flash lamp, among others. The optical pump signal may include a wavelength different than the wavelengths of the optical input signal 102. In these and other embodiments, the optical pump signal may not include any wavelength that is used by the optical input signal 102. In some embodiments, the wavelength of the optical pump signal may be selected based on the optical fiber 108, such as a length, material of the optical fiber 108, among other characteristic of the optical fiber 108. As an example, the optical pump signal may have wavelengths of 810 nm, 980 mm, 1480 nm, among others.

In some embodiments, the optical pump signal may be determined based on gain shape of the EDFA 100. For example, the gain shape or the gain spectrum of the optical fiber 108 may be modified based on the optical pump signal. In these and other embodiments, the optical pump 104 may determine the optical pump signal such that the gain spectrum of the optical fiber 108 is suitable for the optical signal 102 and the optical fiber 108.

In some embodiments, the optical coupler 106 may be optically coupled to the optical pump 104 and the optical fiber 108. In these and other embodiments, the optical coupler 106 may be configured to obtain and to multiplex multiple signals onto the optical fiber 108. For example, the optical coupler 106 may be configured to obtain the optical signal 102 and the optical pump signal and to multiplex and/or combine the optical signal 102 and the optical pump signal to the optical fiber 108. As an example, the optical coupler 106 may be a wavelength division multiplexer (WDM). Alternately or additionally, the optical coupler 106 may include one or more optical components, fused optical fibers, or waveguides to multiplex the optical signal 102 and the optical pump signal.

In some embodiments, the EDFA 100 may be configured to provide a gain to the optical signal 102 such that the power of the optical signal 102 may increase as the optical signal 102 passes through the EDFA 100. For example, the optical fiber 108 may be configured to amplify the optical signal 102 using the optical pump signal. For example, an interaction between the ions of the optical fiber 108 and the optical pump signal may cause emission of energy within the optical fiber 108 which may be used to amplify the optical signal 102.

In some circumstances, the amplification of the optical signal 102 may vary based on the wavelengths of the optical signal 102. For example, signals at different wavelengths may experience different levels of amplifications within the optical fiber 108. In some instances, such varying amplification may be caused due to the gain profile of the optical fiber 108 in which the optical fiber 108 applies different amounts of amplification to signals at different wavelengths. In some embodiments, the optical fiber 108 may be manufactured and/or adjusted such that the optical fiber 108 applies the most amplification to the wavelength range corresponding to the optical signal 102. For example, in some embodiments, the optical signal 102 may have signals carrying data within the S-band of optical communications. In such instances, the optical fiber 108 may be configured to amplify the signals within the S-band such that the optical signal 102 may be transmitted over a distance.

In these and other embodiments, amplified spontaneous emission (ASE) noise in wavelength ranges that do not correspond to the optical signal 102 may be unavoidable. For example, as the optical signal 102 is amplified, the ASE noise outside of the S-band may also be amplified. For example, the optical signal 102 may experience increased ASE noise within a second wavelength range (e.g., the C-band and/or the L-band) and/or a third wavelength range (e.g., the E-band ranging from about 1360 nm to 1460 nm), among others. Such increased ASE noise may affect quality of transmission of the optical signal 102.

In some embodiments, the EDFA 100 may include a filter 110 which may be configured to attenuate and/or reduce the ASE noise present in wavelength ranges within the second wavelength range and/or the third wavelength range. In some embodiments, the filter 110 may be fiber-based. In these and other embodiments, the filter 110 may be made of any type of suitable optical fiber. For example, in some embodiments, the filter 110 may be made of dispersion compensating fiber (DCF). In these and other embodiments, the filter 110 may have a loss profile and/or corresponding gain profile based on the fiber to attenuate the signals within the second wavelength range and/or the third wavelength range. The loss profile may represent different wavelengths in which the signals are experience attenuation within the fiber. In the present disclosure, a reference to the filter 110 may include a reference to the fiber forming the filter 110. For example, a reference to the loss profile of the filter 110 may include a reference to a loss profile of the fiber forming the filter 110. Additionally, in the present disclosure a loss profile may also be referred to as a loss curve.

In some instances, the loss profile of the filter 110 may be determined based at least partially on refractive index profile of the fiber corresponding to the filter 110. The refractive index profile may describe and/or represent how the refractive index of the filter 110 varies across cross-section of the filter 110. For example, the refractive index profile may represent refractive index of the filter 110 in different locations of the optical fiber such as the core and the cladding. The refractive index of the filter 110 may represent how light or amplified optical signal 102 at different frequencies and/or wavelengths propagates through the filter 110.

Optical fibers, in general, may have different types of refractive index profiles. The types of refractive index profiles may be determined based on manufacturing process and/or external components. For example, an optical fiber may have a graded-index profile or a step-index profile. A particular optical fiber having a graded-index profile may have a refractive index that continuously decreases as radial distance from the axis or core of the fiber increases. For example, the particular optical fiber may have higher refractive index in parts closer to the core than the cladding.

Contrastingly, an optical fiber having a step-index profile may have a uniform refractive index within the core and a sharp decrease in the refractive index at the core-cladding interface such that the refractive index at the cladding is lower than the refractive index at the core. The refractive index at the cladding may be low such that the optical signals may leak at a constant value or rate.

Figure 1B:
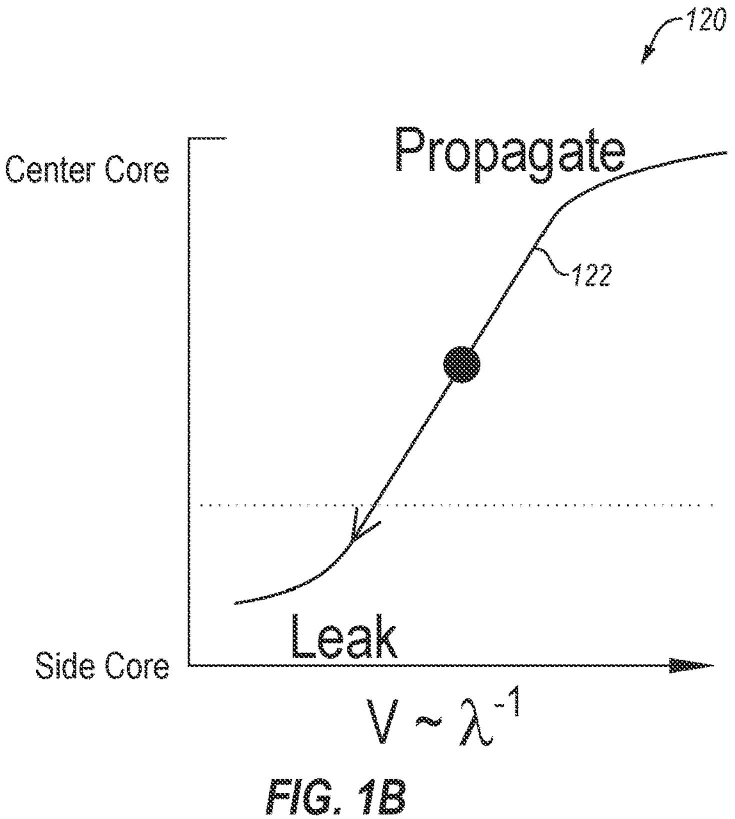
FIG. 1B illustrates an example refractive index profile.

FIG. 1B illustrates an example graded-index profile 120 that may correspond to a general optical fiber different from the filter 110. FIG. 1B is provided as an example, such that the refractive index profile of the filter 110, as discussed with respect to FIG. 1C, may be contrasted with an example graded-index profile, such as the graded-index profile 120. In FIG. 1B, a refractive index 122 decreases with increased distance from the center core of the optical fiber. As the refractive index 122 decreases, and particularly as the optical signals travel further away from the center core, the optical signals propagating through the optical fiber may leak and/or signal energy of the optical signal may be lost.

Returning to FIG. 1A, in some embodiments, the refractive index profile of the filter 110 may be designed such that the refractive index profile of the filter 110 is W-shaped. In some embodiments, the filter 110 may be designed and/or manufactured such that the filter 110 has a W-shaped refractive index profile. For example, different characteristics of the filter 110, such as materials for the core and cladding of the filter 110, usage of dopants or co-dopants, may be determined to modify the refractive index profile. Additionally or alternatively, manufacturing processes such as fabrication techniques, temperature and pressure control, among others, may be modified to manufacture the filter 110 with a W-shaped refractive index profile.

The filter 110 with the W-shaped refractive index profile may have characteristics such that the filter 110 may start leaking signals at certain wavelengths as a propagation mode constant becomes negative in longer wavelengths. For example, unlike the graded-index profiles, in which the refractive index gradually decreases, the refractive index of the W-shaped refractive index profile may decrease sharply at certain wavelengths, similar to step-index profiles. However, unlike general step-index profiles, the refractive index or the propagation mode constant of the W-shaped refractive index profile may drop negative, which generally does not happen with other fibers or refractive indexes. Such negative refractive index may cause increased leakage with respect to signals at wavelengths corresponding to the negative refractive index.

Figure 1C:
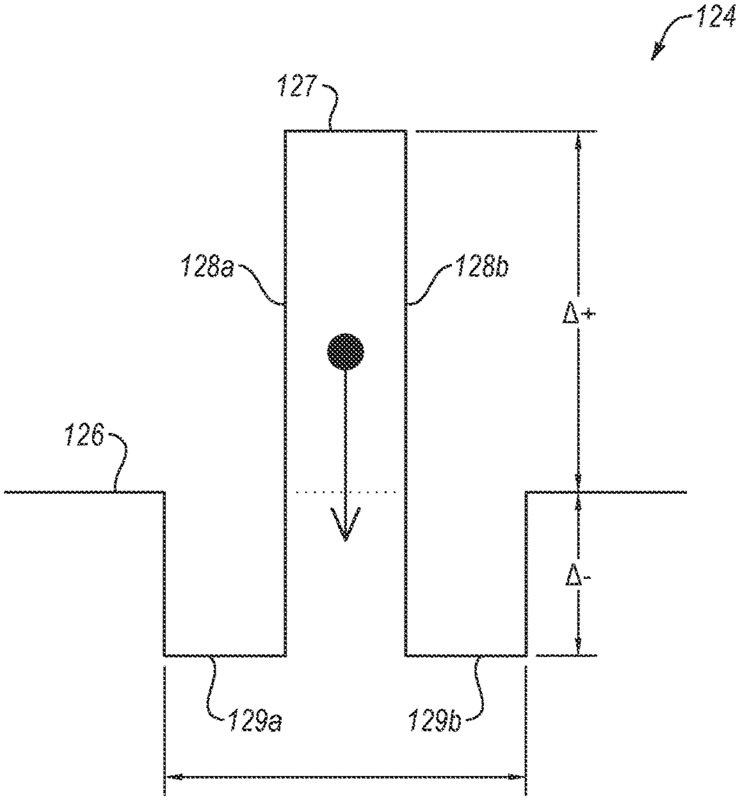
FIG. 1C illustrates an example W-shaped refractive index profile, in accordance with one or more embodiments of the present disclosure.

For example, FIG. 1C illustrates an example refractive index profile 124 of an optical fiber which may correspond to the refractive index profile of the filter 110 of FIG. 1A, in accordance with one or more embodiments of the present disclosure. In some embodiments, the refractive index profile 124 may have a refractive index 126 that generally has a W-shape. For example, the refractive index 126 may have a peak 127 or a highest refractive index corresponding to the core portion of the optical fiber. In these and other embodiments, the refractive index 126 may drop sharply at certain distances away from the center of the core. For example, the refractive index 126 may drop sharply at a first drop point 128*a* and a second drop point 128*b*.

In these and other embodiments, the refractive index 126 may drop negative until a first trench 129*a* and a second trench 129*b*. In some embodiments, the first trench 129*a* and the second trench 129*b* may correspond to clads of the optical fiber. For example, as the light signals travel away from the core of the optical fiber, the refractive index may drop sharply to until the first trench 129*a* and the second trench 129*b* are reached.

Returning to FIG. 1A, in some embodiments in which the filter 110 has a W-shaped refractive index profile, the filter 110 may have a corresponding loss curve that suddenly rises at a certain wavelength. For example, the sudden drops (e.g., the first drop point 128*a* and the second drop point 128*b* of FIG. 1C) and/or trenches (e.g., the first trench 129*a* and the second trench 129*b* of FIG. 1C) present in the refractive index profile may cause the sudden rises in the corresponding loss curve. The loss curve may represent attenuation or loss experienced by a signal as the signal propagates through the filter 110. In some embodiments, the amount of attenuation the optical signals at corresponding wavelengths experience may vary based on the loss curve. For example, as the loss curve suddenly rises at a certain wavelength, the level of attenuation applied to the signals and/or noises at the certain wavelength may correspondingly rise. In some embodiments, such characteristics of the W-shaped refractive index profile (e.g., sudden rise of loss curve at certain wavelength) may be used to remove and/or attenuate the ASE noise of the optical signal with respect to wavelengths not carrying meaningful data. For example, while the optical fiber 108 is performing amplification of the optical signal 102 carrying data within a first wavelength range, unwanted ASE noise may be added to the second wavelength range outside of the first wavelength range. In these and other embodiments, the optical signal 102 may pass through the filter 110 following the amplification using the optical fiber 108 such that the ASE noise in the second wavelength range may be reduced.

In some embodiments, the loss curve of the filter 110 may be shifted such that a loss edge, or the wavelength at which the loss curve suddenly rises, may be shifted and/or modified. Such shifting of the loss edge may allow for adjusting the frequency response of the filter 110 in a manner that may allow for controlling the wavelength range in which the signal and/or noise may be attenuated. For example, the optical signal 102 and/or the optical fiber 108 may have different characteristics in different applications such that the ASE noise may be increased in different wavelength ranges. In such instances, the frequency response or the loss curve of the filter 110 may be adjusted such that the filter 110 may correspond to the optical signal 102 and/or the optical fiber 108.

In some embodiments, the loss edge may be shifted based on bending of the filter 110. For example, bending the filter 110 may shift the refractive index profile and corresponding loss edge of the filter 110. In some embodiments, a bending radius or a level of bending applied to the filter 110 may control how much the loss edge may be shifted. For example, in some embodiments, as the bending radius gets smaller (e.g., tighter bending), the loss edge of the filter 110 may shift toward shorter wavelengths.

Figure 1D:
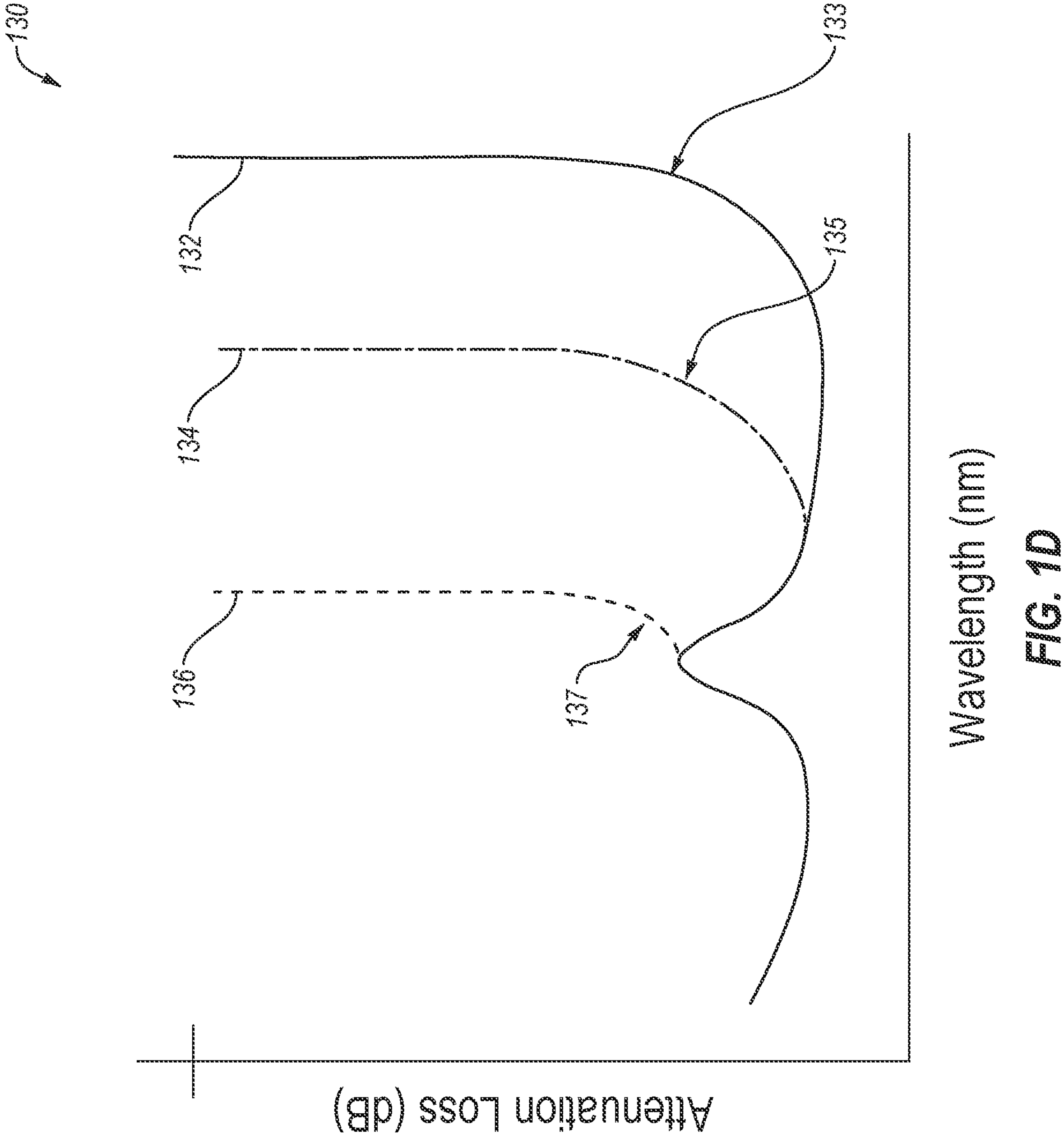
FIG. 1D illustrates an example loss profile, in accordance with one or more embodiments of the present disclosure.

For example, FIG. 1D illustrates an example loss profile 130 illustrating loss curves of an optical fiber, in accordance with one or more embodiments of the present disclosure. For example, the loss profile 130 may be a loss profile corresponding to the filter 110 of FIG. 1A. In these and other embodiments, the optical fiber may have a W-shaped refractive index profile as illustrated in FIG. 1C. In some embodiments, the loss profile 130 may have a first loss curve 132 representing the loss curve of the filter 110 without modification or bending. For example, a first bending radius corresponding to the first loss curve 132 may be zero. In some embodiments, the first loss curve 132 may have a first loss edge 133, at which the loss curve rises. In these and other embodiments, as the signals at wavelengths corresponding to wavelengths of the first loss curve 132 at or past the first loss edge 133 may experience increased attenuation. In some embodiments, as an example, the first loss edge 133 may be around 1600 nm. In such instances, signals and/or noises at wavelengths of 1600 nm or longer may experience increased attenuation.

In some embodiments, the loss profile 130 may illustrate a second loss curve 134 with a second loss edge 135. In these and other embodiments, the second loss curve 134 may represent the loss curve of the filter 110 as the filter 110 is modified or bent at a second bending radius. In some embodiments, the second bending radius may be greater than the first bending radius. In these and other embodiments, the second loss curve 134 and the second loss edge 135 may be shifted toward shorter wavelengths compared to the first loss curve 132 and the first loss edge 133. For example, the second loss edge 135 may be around 1530 nm, in which signals and/or noises at wavelengths greater than 1530 nm may be attenuated. For example, the signals in the C-band (e.g., 1530 nm-1565 nm) and the L-band (e.g., 1565 nm-1625 nm) may be attenuated. Such attenuation may allow amplification of signals in the S-band (e.g., 1495 nm-1530 nm) while reducing the ASE noise in the C-band and the L-band.

In some embodiments, the loss profile 130 may illustrate a third loss curve 136 with a third loss edge 137. In these and other embodiments, the third loss curve 136 may represent loss curve of the filter 110 that is bent at a third bending radius that is greater than the first bending radius and the second bending radius. In these and other embodiments, the third loss curve 136 and the third loss edge 137 may be shifted further toward shorter wavelengths than the second loss curve 134 and the second loss edge 135. For example, the third loss edge 137 may be around 1400 nm in which signals and/or noises at or greater than 1400 nm may be attenuated. Although the loss profile 130 illustrates the first loss edge 133, the second loss edge 135, and the third loss edge 137, the loss profile 130 may have any other suitable loss edges and corresponding loss curves based on the bending radius of the optical fiber.

Figure 1E:
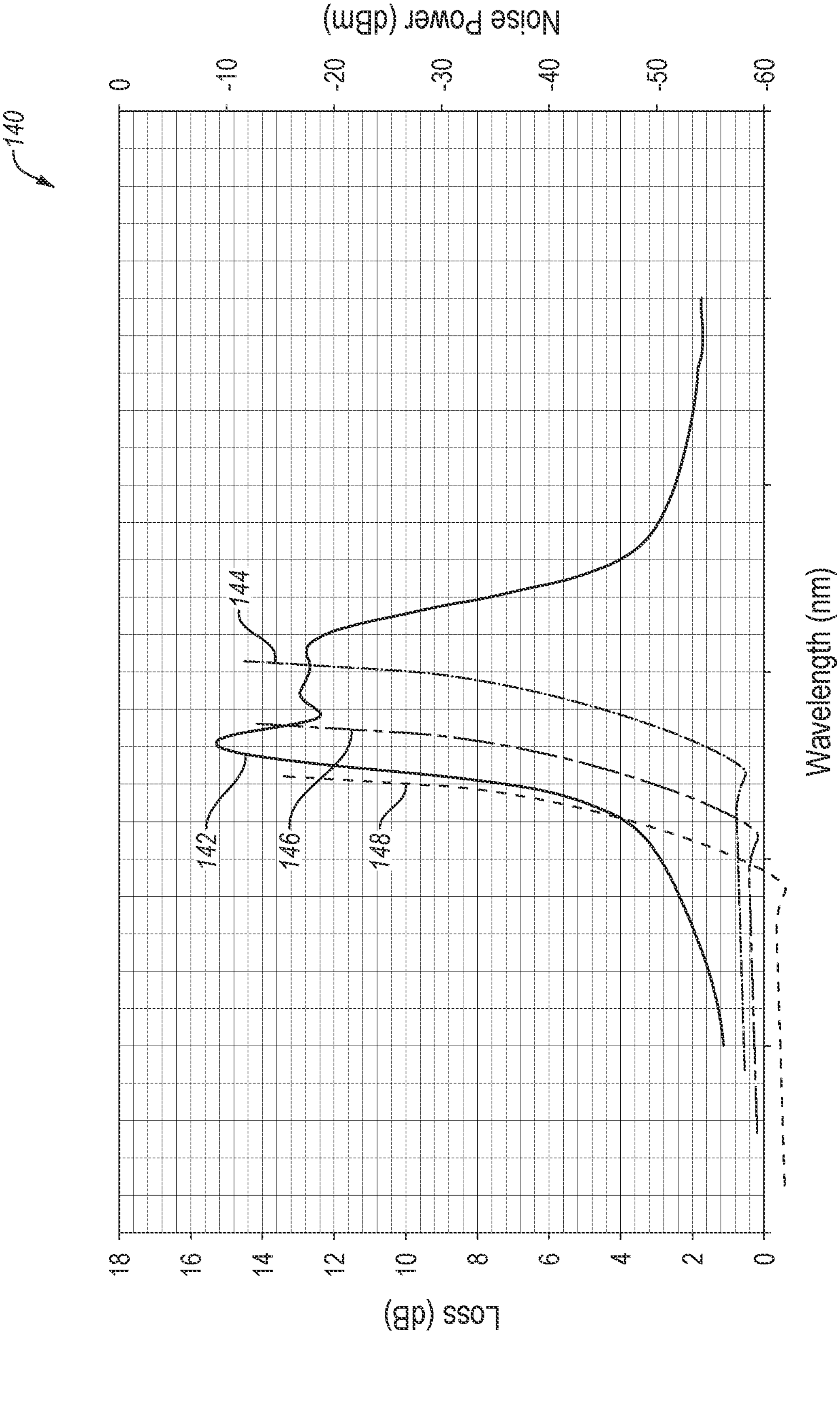
FIG. 1E illustrates another example loss profile, in accordance with one or more embodiments of the present disclosure.

FIG. 1E illustrates another example loss profile 140 of an optical fiber, in accordance with some embodiments of the present disclosure. In some embodiments, the loss profile 140 may be a loss profile of the filter 110 of FIG. 1A. In some embodiments, the loss profile 140 may be associated with an ASE spectrum 142 representing levels of ASE noise caused by the EDFA such as the EDFA 100 of FIG. 1A. Particularly, the ASE spectrum 142 may represent the noises caused by the optical fiber 108 as the optical fiber 108 performs amplification of the optical signal 102. For example, the ASE spectrum 142 may illustrate an increased ASE noise at certain wavelength (e.g., 1500 nm). In these and other embodiments, the loss edge of the filter 110 may be controlled based on bending radius of the filter 110, such that the ASE spectrum 142 may be substantially compensated. For example, the filter 110 may have a first loss curve 144. In some embodiments, the first loss curve 144 may represent the loss curve of the filter 110 at the first bending radius. In some embodiments, the first bending radius may be zero (e.g., the optical fiber 108 may not be bent or modified). In some instances, the first loss curve 144 may have a first loss edge (e.g., 1530 nm) greater than the certain wavelength at which the ASE spectrum rises. In such instances, the ASE noise may not be substantially compensated. For example, the ASE noise present at wavelengths between the certain wavelength and the first loss edge may not be attenuated in the optical fiber having the first loss curve 144.

In these and other embodiments, the filter 110 may be bent to have a bending radius such that the loss edge of the optical fiber may be shifted to correspond to the ASE spectrum 142. For example, the filter 110 may be bent at the second bending radius greater than the first bending radius. In these and other embodiments, the loss curve of the filter 110 may shift toward shorter wavelengths. For example, a second loss curve 146 may illustrate the loss curve of the filter 110 bent at the second bending radius. Such bending may shift the loss curve toward shorter wavelengths corresponding to the second loss curve 146.

In some embodiments, in response to determining that the loss curve with the filter 110 bent at the second bending radius is still not corresponding to the ASE spectrum 142, the filter 110 may be bent at the third bending radius. In these and other embodiments, the third bending radius may be adjusted until the third loss curve 148 is substantially aligned with the ASE spectrum 142. In these and other embodiments, the substantial alignment between the ASE spectrum 142 and the second loss curve 148 may cause substantial attenuation of the ASE noise.

Returning to FIG. 1A, in some embodiments, the bending radius of the filter 110 may be adjusted based on the optical signal 102. For example, the optical signal 102 may carry data within the first wavelength range. In some embodiments, the first wavelength range may correspond to the S-band. In these and other embodiments, the bending radius of the filter 110 may be determined such that the loss curve is shifted to attenuate the ASE noise in the second wavelength range covering wavelengths longer than the S-band. For example, the second wavelength range may correspond to the wavelengths longer than 1530 nm. In these and other embodiments, the filter 110 may be bent such that the loss curve has a loss edge around 1530 nm. In these and other embodiments, the EDFA 100 may amplify the optical signal 102 in the S-band (e.g., 1495 nm to 1530 nm) while attenuating the ASE noise in the C-band and the L-band.

In these and other embodiments, the characteristics of the loss curve corresponding to the W-shaped refractive index profile may allow flexible attenuation of noises associated with amplification of the optical signal 102. For example, the loss curve and the corresponding loss edge may vary based on specific optical fibers. The ability to shift the loss edge to certain wavelength ranges allows amplification of the optical signal 102 regardless of the natural loss edge (e.g., the loss edge of the filter 110 as manufactured) of the filter 110.

In some embodiments, the filter 110 may be bent using a bending structure. For example, the filter 110 may be disposed around the bending structure such that the filter 110 is bent to have a bend corresponding to the bending radius. In these and other embodiments, the bending structure may have set of varying diameters such that the bending radius of the filter 110 may be adjusted. Examples of the bending structure having a set of varying diameters may be disclosed in further detail in the present disclosure, such as with respect to FIGS. 2A and 2B.

Modifications, additions, or omissions may be made to the EDFA 100 without departing from the scope of the present disclosure. For example, in some embodiments, the system 100 may include any number of other components that may not be explicitly illustrated or described. For example, in some embodiments, the EDFA 100 may have multiple stages of amplification.

For example, certain components illustrated in FIG. 1 may be repeated multiple times. For example, the EDFA 100 may include a second erbium-doped optical fiber configured to perform amplification of optical waveforms. The EDFA 100 may include a second optical pump configured to output a second optical pump signal. The EDFA 100 may include a second optical coupler configured to couple the second optical pump signal and the amplified signal 112 onto the second optical fiber such that the amplified signal 112 may be further amplified. In these and other embodiments, the EDFA 100 may include a second filter configured to attenuate the amplified signal 112 following additional amplification by the second optical fiber. The second filter may be configured to attenuate the amplified signal 112 with respect to varying wavelength ranges depending on a second bending radius of the second filter. The second filter may be bent using a second bending structure. In some embodiments, the EDFA 100 may include additional stages of amplification. For example, as the transmittal distance of the optical signal 102 increases, the EDFA 100 may include additional amplification stages.

Figure 2A:
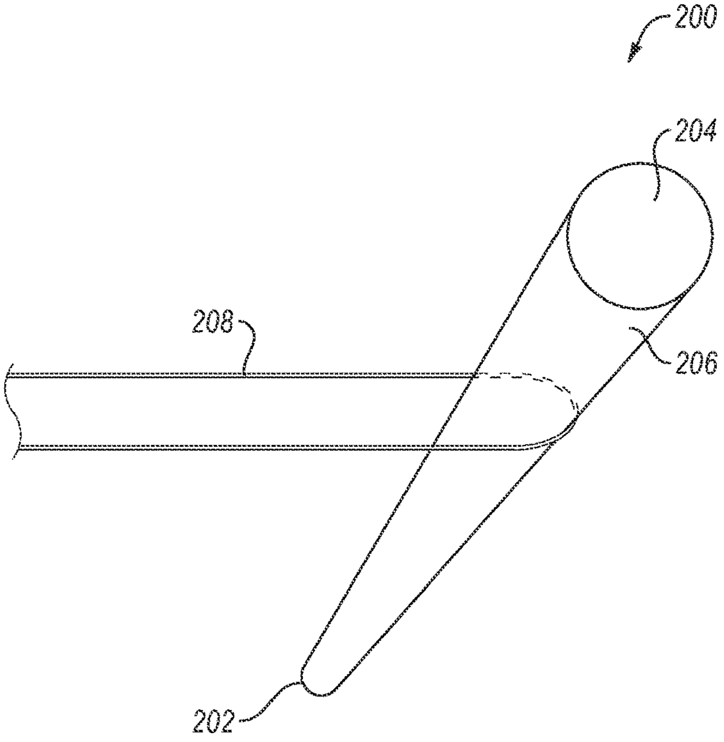
FIGS. 2A-2B illustrate example bending structures, in accordance with one or more embodiments of the present disclosure.

FIG. 2A illustrates a diagram of an example bending structure 200, in accordance with one or more embodiments of the present disclosure. In some embodiments, the bending structure 200 may have a conical shape in which a diameter of the bending structure 200 gradually increases. For example, the bending structure 200 may include a first end 202, a second end 204, and a body 206 extending between the first end 202 and the second end 204. In some embodiments, the first end 202 may have a first diameter, and the second end 204 may have a second diameter greater than the first diameter. In these and other embodiments, the diameter of the body 206 may gradually increase from the first diameter to the second diameter as the body 206 progresses from the first end 202 to the second end 204.

In these and other embodiments, an optical fiber 208 (e.g., the filter 110 of FIG. 1A) may be disposed around the bending structure 200 such that the optical fiber 208 may be bent. The varying diameters of the bending structure may be used to control the bending radius of the optical fiber 208 which may in turn shift the loss curve of the optical fiber. In some embodiments, the conical shape of the bending structure 200 may allow convenient adjustment of the bending radius as the optical fiber 208 may be moved between the first end 202 and the second end 204. In some embodiments, the bending structure 200 may be manufactured using any materials suitable for bending the optical fiber 208 and for allowing the optical fiber to move along therewith. For example, the bending structure 200 may be manufactured using stainless steel, aluminum, glass, among others.

Modifications, additions, or omissions may be made to the bending structure 200 without departing from the scope of the present disclosure. For example, in some embodiments, the bending structure 200 may include any number of other components that may not be explicitly illustrated or described.

Figure 2B:
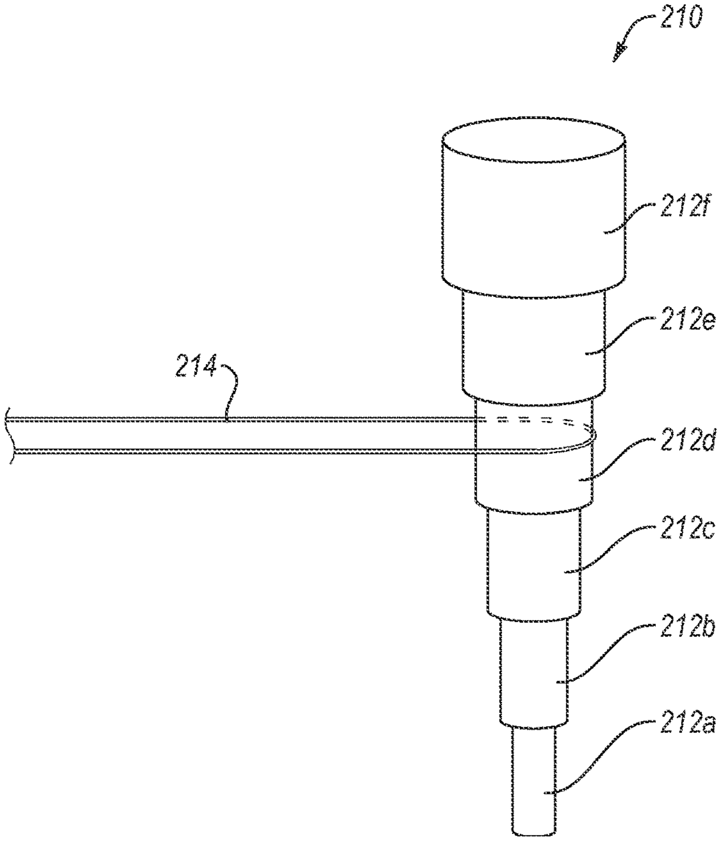

FIG. 2B illustrates another example bending structure 210, in accordance with one or more embodiments of the present disclosure. In some embodiments, the bending structure 210 may include a set of cylinders having a set of varying diameters. For example, the bending structure 210 may include a first cylinder 212*a* having a first diameter, a second cylinder 212*b* having a second diameter, a third cylinder 212*c* having a third diameter, a fourth cylinder 212*d* having a fourth diameter, a fifth cylinder 212*e* having a fifth diameter, and a sixth cylinder 212*f* having a sixth diameter. In some embodiments, the diameters may gradually increase from the first diameter to the sixth diameter. In these and other embodiments, the cylinders may be stacked and/or connected in the order of increasing and/or decreasing diameters. For example, the cylinders may be connected in order of the first cylinder 212*a*, the second cylinder 212*b*, the third cylinder 212*c*, the fourth cylinder 212*d*, the fifth cylinder 212*e*, and the sixth cylinder 212*f*. While illustrated as having six cylinders, the bending structure 210 may include any suitable number of cylinders with varying diameters.

In some embodiments, an optical fiber 214 (e.g., the filter 110 of FIG. 1A) may be disposed around one of the cylinders such that the optical fiber 214 may be bent at bending radius. In these and other embodiments, the optical fiber 214 may be disposed around one of the cylinders such that the bending radius may be controlled and/or adjusted based on the diameters of the cylinders. For example, in instances in which the optical fiber 214 is disposed around the first cylinder 212*a*, the optical fiber 214 may be bent at the smallest bending radius which may cause increased tension on the optical fiber 214.

In some embodiments, in response to determining that the bending radius of the optical fiber around the first cylinder 212*a* is too narrow, the optical fiber 214 may be moved to be disposed around other cylinders with greater diameters. In such instances, the first cylinder 212*a* may be released away from the optical fiber 214 such that the tension in the optical fiber 214 is released. The bending structure 210 may be shifted such that a cylinder with greater diameter, such as the third cylinder 212*c*, is aligned with the optical fiber 214. The bending structure may be shifted back toward the optical fiber 214 such that the third cylinder 212*c* is mated with the optical fiber 214 to provide tension in the optical fiber 214. In some embodiments, the bending structure 210 may be manufactured using any materials suitable for bending the optical fiber 214. For example, the bending structure 210 may be manufactured using stainless steel, aluminum, glass, among others.

Modifications, additions, or omissions may be made to the bending structure 210 without departing from the scope of the present disclosure. For example, in some embodiments, the bending structure 210 may include any number of other components that may not be explicitly illustrated or described.

Figure 3:
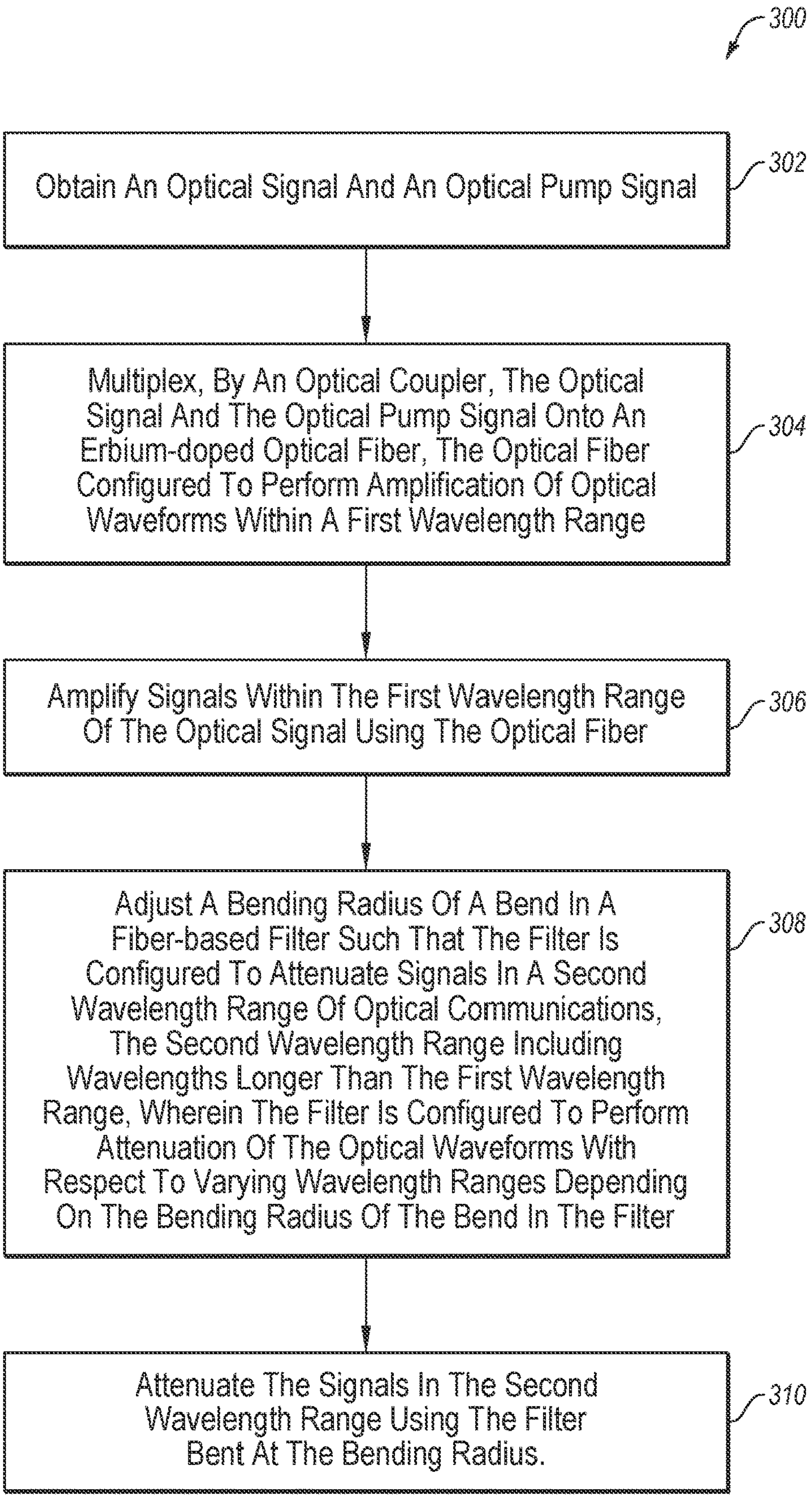
FIG. 3 is a flow chart of an example method of amplifying an optical signal, in accordance with one or more embodiments of the present disclosure.

FIG. 3 is a flow chart of an example method 300 of performing amplification with respect to an optical signal using an EDFA, arranged in accordance with at least one embodiment of the present disclosure. One or more operations of the method 300 may be implemented by any suitable element of an EDFA such as the EDFA 100 of FIG. 1A and bending structures such as the bending structure 200 of FIG. 2A and the bending structure 210 of FIG. 2B. Although illustrated as discrete steps, various steps of the method 300 may be divided into additional steps, combined into fewer steps, or eliminated, depending on the desired implementation. Additionally, the order of performance of the different steps may vary depending on the desired implementation.

In some embodiments, the method 300 may include a block 302. At block 302, an optical signal and an optical pump signal may be obtained and/or received at an EDFA. In some embodiments, the optical signal may include data in wavelengths corresponding to a first wavelength range (e.g., the S-band). In some embodiments, the optical signal may correspond to the optical signal 102 of FIG. 1A, and the optical pump signal may correspond to the optical pump signal generated by the optical pump 104 of FIG. 1A.

At block 304, the optical signal and the optical pump signal may be multiplexed, by an optical coupler, onto an erbium-doped optical fiber, such as the optical fiber 108 of FIG. 1A. In some embodiments, the optical fiber may be configured to perform amplification of optical waveforms within the first wavelength range. For example, the optical fiber may be configured to amplify the optical signals in the S-band.

At block 306, the signals within the first wavelength range of the optical signal may be amplified using the optical fiber. For example, the optical signal may be propagated through the optical fiber, in which the ions of the optical fiber may interact with the optical pump signal to output energy which may be used to amplify the optical signal.

At block 308, the bending radius of a filter may be adjusted such that the filter is configured to attenuate signals in a second wavelength range. In some embodiments, the second wavelength range may include a wavelength range including wavelengths longer than the first wavelength range. For example, in instances in which the first wavelength range corresponds to the S-band, the second wavelength range may correspond to the C-band and/or the L-band of optical communication.

In some embodiments, the filter may be a fiber-based filter, in which the filter may attenuate signals based on loss profile of the fiber. In some embodiments, the filter may have a W-shaped refractive index profile, such as illustrated in FIG. 1C. In these and other embodiments, the filter may have a loss curve that rises at a certain wavelength, which may vary based on the bending radius of the filter, such as illustrated in FIGS. 1D-1E. In some embodiments, the bending radius of the filter may be adjusted such that the loss-curve of the filter may be shifted to correspond to the second wavelength range. For example, the loss curve may be shifted such that the signals within the first wavelength range are not attenuated while the signals and noises outside of the first wavelength range (e.g., the second wavelength range) are attenuated and/or lost. For example, the bending radius may be determined based on location of a loss edge on the loss curve of the filter. In some embodiments, adjusting the loss curve of the filter based on the bending radius of the bend in the filter may be described with further detail in the present disclosure, such as with respect to the filter 110 of FIG. 1A.

In some embodiments, the bending radius of the filter may be adjusted using a bending structure having a set of varying diameters. For example, a bending structure, such as illustrated in FIGS. 2A-2B of the present disclosure, may be obtained. The filter may be disposed around the bending structure such that the bending radius is adjustable by moving the filter along different portions of the bending structure corresponding to different diameters of the set of varying diameters.

At block 310, signals in the second wavelength range may be attenuated. In some embodiments, the attenuation may allow the ASE noises generated from the amplification of the optical signals within the optical fiber to be reduced. Such attenuation may allow the optical signal to be amplified without the quality of the optical signal being affected by unwanted noise signals. In some embodiments, the EDFA may further attenuate signals in a third wavelength range. For example, one or more additional filters may be used to attenuate the signals in the third wavelength range. In these and other embodiments, the third wavelength range may correspond to wavelength ranges including wavelengths shorter than the first wavelength range. For example, the third wavelength range may correspond to the E-band of optical communications.

Modifications, additions, or omissions may be made to the method 300 without departing from the scope of the present disclosure. For example, one skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
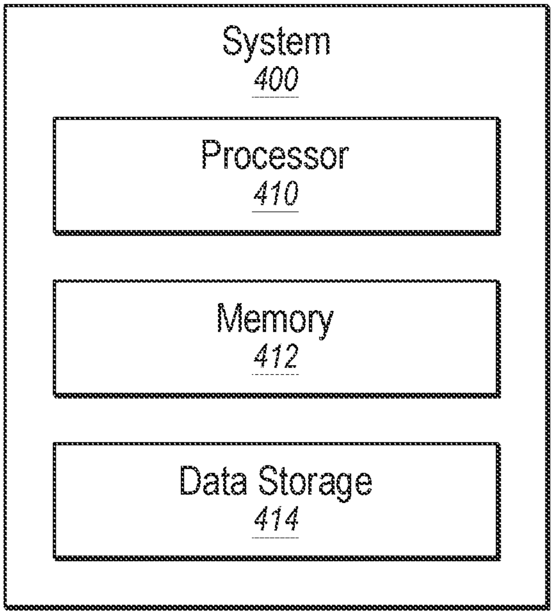
FIG. 4 illustrates a block diagram of an example computing system that may be used with the EDFA, in accordance with one or more embodiments of the present disclosure.

FIG. 4 illustrates a block diagram of an example computing system 400 that may be used with respect an EDFA, according to at least one embodiment of the present disclosure. For example, the computing system 400 may be used to adjust a pumping wavelength of a pump source of the EDFA (e.g., one or more of the pump sources described above) and/or a frequency response of a filter of the EDFA (e.g., one or more of the filters described above). Additionally or alternatively, the computing system 400 may be used to determine a bending radius of the EDF to modify the loss profile of the EDFA.

The computing system 400 may include a processor 410, a memory 412, and a data storage 414. The processor 410, the memory 412, and the data storage 414 may be communicatively coupled.

In general, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 410 may include any number of processors configured to, individually or collectively, perform or direct performance of any number of operations described in the present disclosure. Additionally, one or more of the processors may be present on one or more different electronic devices, such as different servers.

In some embodiments, the processor 410 may be configured to interpret and/or execute program instructions and/or process data stored in the memory 412, the data storage 414, or the memory 412 and the data storage 414. In some embodiments, the processor 410 may fetch program instructions from the data storage 414 and load the program instructions in the memory 412. After the program instructions are loaded into memory 412, the processor 410 may execute the program instructions.

The memory 412 and the data storage 414 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

Modifications, additions, or omissions may be made to the computing system 400 without departing from the scope of the present disclosure. For example, in some embodiments, the computing system 400 may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An optical amplifier comprising:

a first bending structure having a plurality of diameters;

a first erbium-doped optical fiber ("first optical fiber") configured to perform amplification of optical waveforms;

an optical pump configured to output an optical pump signal;

an optical coupler coupled to the optical pump and the optical fiber, the optical coupler configured to multiplex one or more optical data signals and the optical pump signal onto the optical fiber; and a first fiber-based filter ("first filter") configured to:

attenuate the optical waveforms with respect to varying wavelength ranges depending on a bending radius of a bend in the first filter; and be disposed around a first bending structure to form the bend and being disposed such that the bending radius is adjustable by moving the first filter along different portions of the first bending structure corresponding to different diameters of the plurality of diameters.

2. The optical amplifier of claim 1, wherein the first optical fiber is configured to amplify signals within a first wavelength range.

3. The optical amplifier of claim 2, wherein the bending radius is adjusted such that the first filter is configured to attenuate a second wavelength range of optical communications, the second wavelength range being greater than the first wavelength range.

4. The optical amplifier of claim 3, wherein:

the first wavelength range corresponds to an S-band of optical communications; and the second wavelength range corresponds to one or more of C-band or L-band of optical communications.

5. The optical amplifier of claim 1, wherein the first filter has a W-shaped refractive index profile.

6. The optical amplifier of claim 5, wherein the bending radius of the first filter is determined based on the W-shaped refractive index profile.

7. The optical amplifier of claim 6, wherein the bending radius of the first filter is determined further based on wavelengths of the one or more optical data signals.

8. The optical amplifier of claim 1, wherein the first bending structure has a conic shape having a first end and a second end, the first end having a first diameter smaller than a second diameter of the second end, the conic shape increasing in diameter from the first end to the second end to include the plurality of diameters.

9. The optical amplifier of claim 1, wherein the first bending structure includes a plurality of cylinders corresponding to the plurality of diameters.

10. The optical amplifier of claim 1, wherein the plurality of diameters of the first bending structure is a first plurality of diameters and wherein the optical amplifier further comprises:

a second bending structure having a second plurality of diameters;

a second erbium-doped optical fiber configured to perform amplification of optical waveforms with respect to varying wavelength ranges;

a second optical pump configured to output a second optical pump signal;

a second optical coupler coupled to the second optical pump and the second optical fiber, the second optical coupler configured to multiplex output optical data signals from the first optical fiber and the second optical pump signal onto the second optical fiber; and a second fiber-based filter ("second filter") configured to:

attenuate the optical waveforms with respect to varying wavelength ranges depending on a second bending radius of a second bend in the second filter; and be disposed around a second bending structure to form the second bend and being disposed such that the second bending radius is adjustable by moving the second filter along different portions of the second bending structure corresponding to different diameters of the plurality of diameters.

11. A method to amplify a signal comprising:

obtaining an optical signal and an optical pump signal;

multiplexing, by an optical coupler, the optical signal and the optical pump signal onto an erbium-doped optical fiber, the optical fiber configured to perform amplification of optical waveforms within a first wavelength range;

adjusting a bending radius of a bend in a fiber-based filter such that the filter is configured to attenuate signals in a second wavelength range of optical communications, the second wavelength range including wavelengths longer than the first wavelength range, wherein the filter is configured to perform attenuation of the optical waveforms with respect to varying wavelength ranges depending on the bending radius of the bend in the filter; and attenuating the signals in the second wavelength range using the filter bent at the bending radius.

12. The method to amplify a signal of claim 11, wherein the first wavelength range corresponds to an S-band of optical communications; and the second wavelength range corresponds to one or more of C-band or L-band of optical communications.

13. The method to amplify a signal of claim 11, wherein:

the filter is disposed around a bending structure having a plurality of diameters, wrapping of the filter around the bending structure forming the bend in the filter; and the adjusting of the bending radius of the filter includes moving a position of the filter along the bending structure such that the filter is wrapped around a particular portion of the bending structure having a particular diameter that corresponds to causing the bend to have the bending radius.

14. The method to amplify a signal of claim 13, wherein the bending structure has a conic shape with a first end and a second end, the first end having a first diameter and the second end having a second diameter larger than the first diameter, diameter of the bending structure gradually increasing from the first end to the second end.

15. The method to amplify a signal of claim 13, wherein the bending structure comprises a plurality of cylindrical structures corresponding to the plurality of diameters.

16. The method to amplify a signal of claim 11, wherein the bending radius is determined based on location of a loss edge on a loss curve corresponding to the filter, the loss curve corresponding to a W-shaped refractive index profile of the filter.

17. One or more non-transitory computer-readable media storing instructions that, when executed by one or more processors, cause a system to perform operations, the operations comprising:

obtaining an optical signal and an optical pump signal;

multiplexing, by an optical coupler, the optical signal and the optical pump signal onto an erbium-doped optical fiber, the optical fiber configured to perform amplification of optical waveforms with respect to varying wavelength ranges;

amplifying signals within a first wavelength range of the optical signal using the optical fiber;

determining a bending radius of a bend in a fiber-based filter based on the optical signal and a loss curve of the filter, such that the filter is configured to attenuate a second wavelength range of optical communications, the second wavelength range including wavelengths longer than the first wavelength range, wherein the filter is configured to perform attenuation of optical waveforms with respect to varying wavelength ranges depending on the bending radius of the bend;

adjusting the bending radius of the filter; and attenuating the second wavelength range of optical communications.

18. The one or more non-transitory computer-readable media of claim 17, the operations further comprising:

attenuating a third wavelength range, the third wavelength range including wavelengths shorter than the first wavelength range.

19. The one or more non-transitory computer-readable media of claim 18, wherein:

the first wavelength range corresponds to an S-band of optical communications;

the second wavelength range corresponds to at least a E-band of optical communications; and the third wavelength range corresponds to at least a C-band of optical communications.

20. The one or more non-transitory computer-readable media of claim 17, wherein the bending radius of the filter is adjusted using a bending structure.

* * * * *